(12) United States Patent
Zimmermann et al.

(10) Patent No.: US 8,370,888 B2
(45) Date of Patent: Feb. 5, 2013

(54) HYDRA: HIGH-PERFORMANCE DATA RECORDING ARCHITECTURE FOR STREAMING MEDIA

(75) Inventors: Roger Zimmermann, Walnut, CA (US); Dwipal A. Desai, Los Angeles, CA (US); Kun Fu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1806 days.

(21) Appl. No.: 11/157,557

(22) Filed: Jun. 21, 2005

(65) Prior Publication Data

US 2005/0283818 A1 Dec. 22, 2005

Related U.S. Application Data

(60) Provisional application No. 60/581,888, filed on Jun. 22, 2004.

(51) Int. Cl.
*H04N 7/173* (2011.01)
*G06F 15/173* (2006.01)

(52) U.S. Cl. ............... 725/115; 725/93; 709/226
(58) Field of Classification Search .............. 725/93, 725/95, 97, 115; 709/226
See application file for complete search history.

(56) References Cited

U.S. PATENT DOCUMENTS

| | | | | |
|---|---|---|---|---|
| 5,778,056 | A * | 7/1998 | Ely et al. .................. | 379/221.09 |
| 6,674,994 | B1 | 1/2004 | Fell et al. | |
| 2002/0059620 | A1 * | 5/2002 | Hoang ........................ | 725/87 |
| 2003/0088876 | A1 * | 5/2003 | Mao et al. .................. | 725/91 |
| 2003/0135863 | A1 * | 7/2003 | Van Der Schaar .......... | 725/95 |
| 2004/0013119 | A1 * | 1/2004 | MeLampy et al. ......... | 370/395.21 |
| 2004/0031056 | A1 * | 2/2004 | Wolff ........................ | 725/110 |
| 2005/0289619 | A1 | 12/2005 | Melby | |

FOREIGN PATENT DOCUMENTS

US WO2006002314 1/2006

OTHER PUBLICATIONS

Zimmerman, Roger; Fu, Kun; Ku, We-Shinn, "Design of a Large Scale Data Stream Recorder", Apr. 23, 2003, Integrated Media Systems Center at University of Southern California, 5th International Conference on Enterprise Information Systems 2003, pp. 1-10.*
Holfelder, Wieland. MBone VCR: video conference recording on the MBone. In Proceedings of the third ACM International Conference on Multimedia (ACM Multimedia 1995), pp. 237-238, publisher ACM Press, San Francisco, California, United States, Nov. 5-9, 1995.

(Continued)

*Primary Examiner* — Nasser Goodarzi
*Assistant Examiner* — Hyun Hong
(74) *Attorney, Agent, or Firm* — McDermott Will & Emery LLP

(57) ABSTRACT

A data stream recorder system, for multi-stream recording and retrieval of utilizes a number of gateways, each for sending and receiving packets containing streaming multimedia content data at real-time rates via a packet data network. A session manager communicates via the network with source client devices and receiver client devices, to establish and control recording and retrieval sessions. The manager assigns sessions to the gateways for the sending and receiving of the packets to and from client devices. Content is distributed across storage devices associated in storage nodes. Each of the gateways receives packets containing content data at real time rates during a recording session and distributes the received packets from the session across all of the storage nodes. A scheduler of each respective storage node distributes content data from packets distributed to the respective storage node, across all of the digital storage devices of the respective storage node.

11 Claims, 8 Drawing Sheets

OTHER PUBLICATIONS

Lambrinos, Lambros, Peter Kirstein, and Vicky Hardman. The Multicast Multimedia Conference Recorder. In Proceedings of the International Conference on Computer Communications and Networks, ICCCN, pp. 208-213, vol. 00, publisher IEEE, Lafayette, Louisiana, Oct. 12-15, 1998.

Zimmermann, Roger, Kun Fu, and Wei-Shinn Ku. Design of a Large Scale Data Stream Recorder. In Proceedings of the 5th International Conference on Enterprise Information Systems (ICEIS 2003), pp. 156-168, publisher ICEIS Press, Angers, France, Apr. 23-26, 2003. URL: http://www.iceis.org/.

Zimmermann, Roger and Kun Fu. Comprehensive Statistical Admission Control for Streaming Media Servers. In Proceedings of the 11th ACM International Multimedia Conference (ACM Multimedia 2003), pp. 75-85, publisher ACM Press, Berkeley, California, Nov. 2-8, 2003.

Fu, Kun and Roger Zimmermann. Memory Management for Large Scale Data Stream Recorders. In Proceedings of the 6th International Conference on Enterprise Information Systems (ICEIS 2004), vol. 1: "Databases and Information Systems Integration," pp. 54-62, publisher ICEIS Press, Porto, Portugal, Apr. 14-17, 2004. URL: http://www.iceis.org/.

Fu, Kun and Roger Zimmermann. Randomized Data Allocation in Scalable Streaming Architectures. In Proceedings of the 10th International Conference on Database Systems for Advanced Applications (DASFAA 2005), pp. 474-486, publisher Springer, Friendship Hotel, Beijing, P.R. China, Apr. 18-20, 2005.

International Search Report for PCT Application No. PCT/US05/22259, International Filing Date, Jul. 22, 2005. Search Report mailed Mar. 7, 2008.

* cited by examiner

*S->R:*
*ANNOUNCE rtsp://imsc.usc.edu/openhouse RTSP/1.0*
*CSeq: 90*
*Content-Type: application/sdp*
*Content-Length: 121*
*s=IMSC Open House Demo*
*u=http://imsc.usc.edu*
*t=3080271600 30807030600*

*R->S:*
*RTSP/1.0 200 OK*
*CSeq: 90*

*S->R:*
*SETUP rtsp://imsc.usc.edu/openhouse/audiotrack RTSP/1.0*
*CSeq: 91*
*Transport: RTP/AVP;multicast;destination=10.0.1.1;port=21010-21011;mode=record;ttl=127*

*R->S:*
*RTSP/1.0 200 OK*
*CSeq: 91*
*Session: 50887676*
*Transport: RTP/AVP;multicast;destination=10.0.1.1;port=21010-21011;mode=record;ttl=127*

*S->R*
*SETUP rtsp://imsc.usc.edu/openhouse/videotrack RTSP/1.0*
*CSeq: 92*
*Session: 50887676*
*Transport: RTP/AVP;multicast;destination=10.1.1.2;port=61010-61011;mode=record;ttl=127*

*R->S*
*RTSP/1.0 200 OK*
*CSeq: 92*
*Transport: RTP/AVP;multicast;destination=10.1.1.2;port=61010-61011;mode=record;ttl=127*

*S->R:*
*RECORD rtsp://server.example.com/meeting RTSP/1.0*
*CSeq: 93*
*Session: 50887676*
*Range: clock=19961110T1925-19961110T2015*

*R->S:*
*RTSP/1.0 200 OK*
*CSeq: 93*

FIG. 2

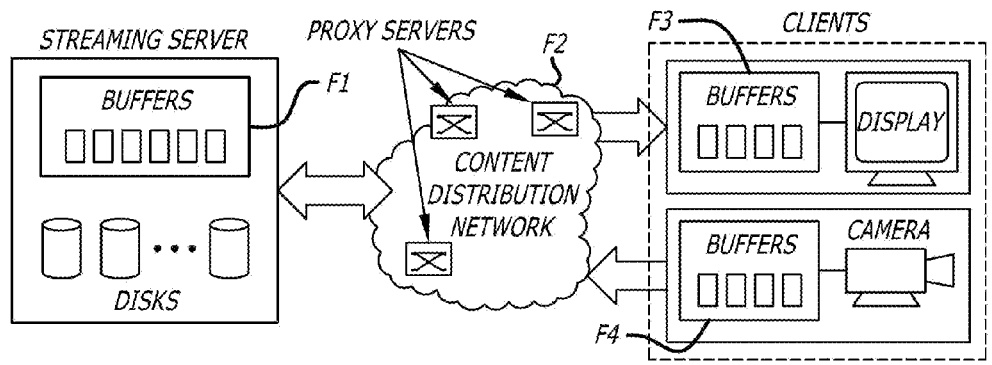
FIG. 4
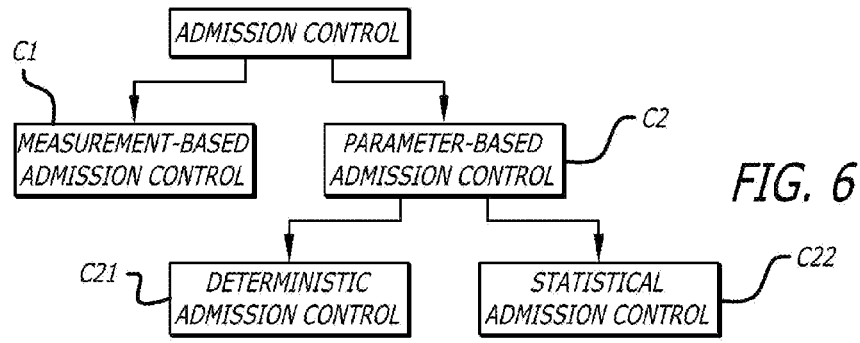
FIG. 6
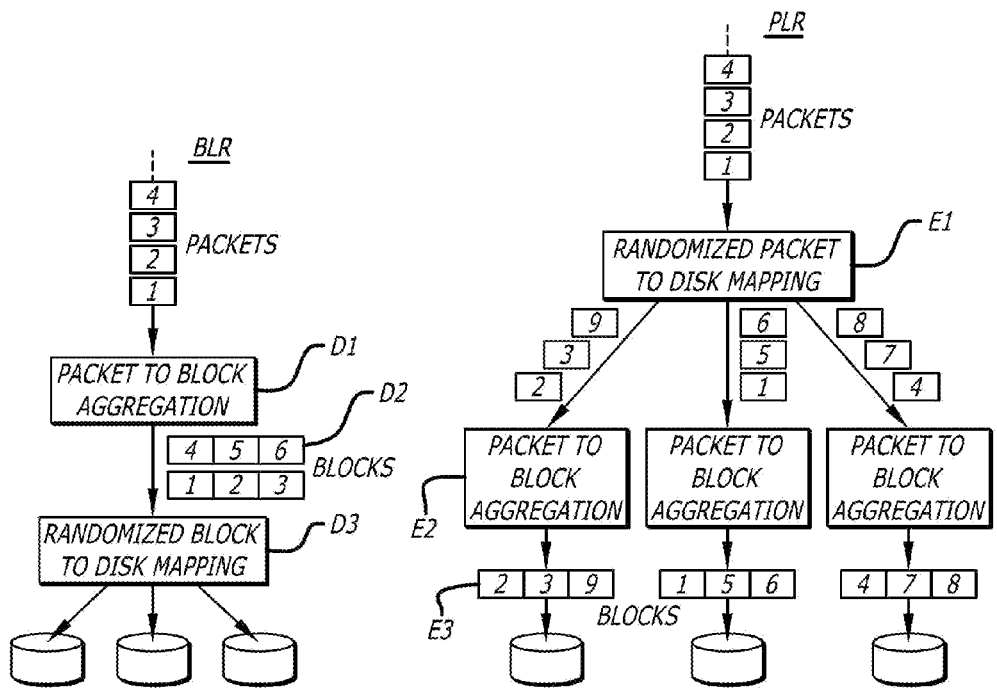
FIG. 9A
FIG. 9B

HYDRA: HIGH-PERFORMANCE DATA RECORDING ARCHITECTURE FOR STREAMING MEDIA

RELATED APPLICATIONS

This application claims the benefit of U.S. Provisional Application No. 60/581,888 filed Jun. 22, 2004 entitled "HYDRA: HIGH-PERFORMANCE DATA RECORDING ARCHITECTURE FOR STREAMING MEDIA," the disclosure of which also is entirely incorporated herein by reference.

GOVERNMENT'S INTEREST IN APPLICATION

This invention was made with government support under Grant No. EEC-9529152 and IIS-0082826, awarded by the National Science Foundation. The government has certain rights in the invention.

TECHNICAL FIELD

The present subject matter relates to techniques and equipment to provide scalable multi-stream digital recording and playback of streaming media type content material, capable of efficient handling of multiple concurrent sessions. The recording/playback system may also be configured to handle any of a variety of different types of digital streaming media content.

BACKGROUND

Presently, digital continuous media (CM) are well established as an integral part of many applications. Common applications facilitate distribution of content material prepared off-line, e.g. movies or TV programs for communication over the Internet. There also is an increasing interest in such communication for a number of different applications areas, such as business communications (e.g., teleconferencing), social interactions, entertainment, and more. However, current implementations of streaming media systems suffer from a number of limitations, particularly for such live applications. For example, due to processing or bandwidth constraints, the picture resolution and quality is limited. Consequently, the small rendering of the remote participants does not convey a good sense of presence in the local environment. Current technological trends point towards continued improvements in broadband bandwidth availability and computing resources. As a result, high quality live audio and video streaming are becoming feasible. The Integrated Media Systems Center (IMSC) at the University of Southern California explores such applications in the education, communication and entertainment spaces in addition to pursuing basic research.

Two of the main characteristics of digital continuous media (CM) are that (1) they require real time storage and retrieval, and (2) they require high bandwidths and space. Over the last decade, a considerable amount of research has focused on the efficient retrieval of such media for many concurrent users, for communication of streaming content material prepared and stored in non-real time (typically off-line). Algorithms to optimize issues such as data placement, disk scheduling, admission control, transmission smoothing, etc., for efficient retrieval have been reported in the literature.

Almost without exception these prior research efforts assumed that the CM streams were readily available as pre-existing files and could be loaded onto the servers offline, without the real time constraints that the complementary stream retrieval required. This is certainly a reasonable assumption for many applications where the multimedia streams are produced offline (e.g., movies, commercials, educational lectures, etc.). In such an environment, streams may originally be captured onto tape or film. Sometimes the tapes store analog data (e.g., VHS video) and sometimes they store digital data (e.g., DV camcorders).

However, the current technological trends are such that more and more sensor devices (e.g., cameras) can directly produce digital data streams. Furthermore, some of these new devices are network-capable either via wired (SDI, Firewire) or wireless (Bluetooth, IEEE 802.11x) connections. Hence, the need arises to capture and store these streams with an efficient data stream recorder that can handle both recording and playback of many streams simultaneously and provide a central repository for all data.

The applications for such a recorder start at the low end with small, personal systems. For example, the "digital hub" in the living room envisioned by several companies will in the future go beyond recording and playing back a single stream as is currently done by TiVo and ReplayTV units. Multiple camcorders, receivers, televisions, and audio amplifiers will all connect to the digital hub to either store or retrieve data streams. At the higher end, movie production will move to digital cameras and storage devices. For example, George Lucas' "Star Wars: Episode II Attack of the Clones" was shot entirely with high-definition digital cameras. Additionally, there are many sensor networks that produce continuous streams of data. For example, NASA continuously receives data from space probes. Earthquake and weather sensors produce data streams as do web sites and telephone systems. Systems capable of concurrent recording and playback/distribution of high quality streams will also support a variety of real-time interactive applications, such as videophone and video conferencing.

For large scale data stream recorders, a goal is to produce a unified architecture that integrates multi-stream recording and retrieval in a coherent paradigm. Existing multi-disk continuous media server designs can largely be classified into two different paradigms: (1) Data blocks are striped in a round-robin manner across the disks and blocks are retrieved in cycles or rounds on behalf of all streams. (2) Data blocks are placed randomly across all disks and the data retrieval is based on a deadline for each block. The first paradigm attempts to guarantee the retrieval or storage of all data. It is often referred to as deterministic. With the second paradigm, by its very nature of randomly assigning blocks to disks, no absolute guarantees can be made. For example, a disk may briefly be overloaded, resulting in one or more missed deadlines. This approach is often called statistical.

One might at first be tempted to declare the deterministic approach intuitively superior. However, the statistical approach has many advantages. For example, the resource utilization achieved can be much higher because the deterministic approach must use worst case values for all parameters such as seek times, disk transfer rates, and stream data rates, whereas the statistical approach may use average values. Moreover, the statistical approach can be implemented on widely available platforms such as Windows or Linux which do not provide hard real time guarantees. It also lends itself very naturally to supporting a variety of different media types that require different data rates (both constant (CBR) or variable (VBR)) as well as interactive functions such as pause, fast-forward and fast-rewind. Finally, it has been shown that the performance of a system based on the statistical method is on par with that of a deterministic system.

For these reasons, further discussion here will focus largely on the statistical approach. It has been shown that the probability of missed deadlines in such a system follows roughly an exponential curve. Hence, up to a certain system utilization (say 80%) a very low stream hiccup probability can be achieved. By the same token it is very important to know how every additional stream will affect the system utilization. Consequently, there is a need for a comprehensive admission control algorithm that enables an accurate calculation of the stream hiccup probability and system utilization.

The design goals for a CM storage and retrieval architecture can be summarized as follows:
1) Provide support for the real time recording of multiple, concurrent streams that are of various media types. For example, streams may be received at different average bit rates and be encoded with constant (CBR) or variable bit rate (VBR) techniques.
2) Provide support for the synchronized recording of multiple streams.
3) Be a modular, scalable architecture.
4) Use unified algorithms (e.g., data placement and scheduling) that can accommodate both recording and playback simultaneously in any combination with low latency.

Several issues have been addressed by themselves in academic research. For example, the purpose of the Multicast Multimedia Conference Recorder (MMCR) project was to capture and play back multicast (MBone) sessions. The authors for that project focused more on the higher level aspects such as indexing and browsing the available sessions, while assuming only a small number of concurrent sessions. The MMCR literature did not specifically develop a scalable, high performance architecture where resources (memory, disk space and bandwidth) need to be carefully scheduled.

There are also commercial systems available.

1. Streaming media systems (e.g., Microsoft's Windows Media, Apple's QuickTime, RealNetworks' RealOne). These systems are optimized for streaming of previously (offline) stored content. Some of them also allow real time live streaming (i.e., forwarding with no recording). They are designed for multi-user access and multiple media types. They cannot usually take advantage of a cluster of server nodes.

2. Personal Video Recorders (PVR), for example the TiVo and ReplayTV models and the SnapStream software. These systems allow real time recording and playback of standard broadcast quality video. Some of the limitations are that they are designed as single-user systems. Furthermore, they are optimized for a single media type (NTSC/PAL/SECAM video with two channels of audio). Local playback is supported and with newer models file sharing is enabled over a network. However, they do not provide streaming playback over a network.

3. Editing systems and broadcast servers. These systems are the professional cousins of the PVRs. They are used for the production and distribution of video content (e.g., to TV stations) and they are designed to interface via professional I/O standards (usually not Ethernet). Their use is for local environments, not distributed streaming setups. Most of the time they handle only a few media types and one (or a few) streams at a time. Their special purpose hardware and elaborate control interfaces to other studio equipment places them into a price category that makes them not cost-effective for use as a more general purpose stream recorder.

As indicated, none of these categories of available systems provides the full functionality that would be desirable. Each one of them only provides a subset of the desired functionalities.

The Integrated Media Systems Center (IMSC) at the University of Southern California developed a high-performance data recording system, as described in: Roger Zimmermann, Kun Fu and Wei-Shinn Ku, *Design of a Large Scale Data Stream Recorder*, Integrated Media Systems Center, University of Southern California, presented at the 5th International Conference on Enterprise Information Systems (ICES 2003), Apr. 23-26, 2003. However, even that system did not provide the full functionality with the desired level of performance and scalability.

In that proposed system, the data stream recorder receives the data at a single receiver unit, which provides admission control for new streams and optional time stamping of packets. Of particular note, the one receiver also provides packet-to-storage-node assignment and routing as well as storage node coordination and communication. The one receiver distributes the incoming data to multiple storage nodes. Each storage node manages one or more local disk storage devices. For incoming packets from the receiver, the storage node performs such functions as packet-to-block aggregation, memory buffer management, block data placement on each storage device and real time disk head scheduling. Outgoing packets for communication of retrieved content apparently go directly from the storage nodes to the wide area network, and thence to the receiving client device(s). For example, an added function performed as a distributed function by the storage nodes is the retrieval scheduling for each outgoing stream, which is assembled from content data retrieved from devices at multiple storage nodes.

The use of a central receiver to process all incoming stream creates a bottleneck at that receiver. Although the architecture can be scaled to store more data by adding storage nodes, it is difficult to address issues of bandwidth and session management at the receiver, when attempting to handle increased numbers of incoming streams. The coordination of scheduling across multiple storage nodes, for each outgoing stream, also may present issues as the system scales up to handle more traffic.

SUMMARY

A data stream recorder system is provided, for real-time multi-stream recording, retrieval and control of multimedia content via a packet data network. The examples provide a unified architecture that integrates multi-stream recording and retrieval. To efficiently handle multiple sessions/streams and provide a readily scalable architecture, the exemplary recorder system utilizes a number of gateways, each for sending and receiving packets containing streaming multimedia content data at real-time rates via the packet data network. A session manager communicates via the network with source client devices and receiver client devices, to establish and control sessions through the packet data network. The manager assigns sessions to the gateways for the sending and receiving of the packets to and from client devices.

The system also includes a number of storage nodes, for storing multimedia content data from received packets and for providing stored multimedia content data to the gateways for communication to the receiving client devices. Each respective storage node includes digital storage devices, for storage and retrieval of distributed portions of multimedia content data for multiple sessions, and a scheduler. The scheduler controls distribution of content data from packets received at the respective node, for storage across the digital storage devices of the respective storage node. In such a multimedia recording/retrieval system, each of the gateways receives packets containing content data at real time rates during a recording session and distributes the received packets from the session across all of the storage nodes. Each scheduler of a respective storage node distributes content data from packets distributed to the respective storage node, across all of the digital storage devices of the respective storage node.

In such an architecture, the session manager can provide central high-level control of all recording and retrieval functions. However, the packet streams for the sessions are actually processed through the gateways. For example, different gateways handle different groups of sessions. Scaling the system to handle more sessions only requires adding one or more new gateways and appropriately provisioning the session manager to assign sessions to the new gateway(s). For large numbers of sessions, the gateways also offer a single point of contact and coordination, e.g. for each outgoing stream, and thus can coordinate retrieval scheduling for each outgoing stream.

Also, the session manager may be configured to monitor resource utilization at each of the gateways. In turn, the session manager will assign different sessions for sending or receiving different streams to respective gateways, based on the current workload and resources available at each of the gateways. For example, this assignment can provide load balancing between the gateways. The session manager also implements an admission control algorithm. In the example, the session manager uses statistical admission control with respect to each new session, to assign each new station to one of the gateways in such a manner as to accommodate variable bit rate (VBR) streams and multizone disk drives as the digital storage devices.

Examples are disclosed in which the gateways and storage nodes are configured to receive, store, retrieve and send streaming multimedia content data of multiple different digital media types. Different types of continuous media discussed below include CD-quality audio, NTSC quality MPEG encoded video, HD quality MPEG encoded video, digital video (DV), DVCPRO50, DVCPROHD, and high definition camera (HDCAM) video.

In the disclosed examples of the system, each respective storage node includes an element for aggregating content data from received packets into data blocks for storage on the digital storage devices of the respective storage node. This element aggregates content data sequentially from the received packets into the data blocks. In such an implementation, the scheduler of each respective storage node randomly assigns the data blocks in sequence to the digital storage devices of the respective storage node. The scheduler may also randomly assign content data from the received packets to the digital storage devices of the respective storage node.

The random distribution by the scheduler may provide block level randomization, however, the example uses packet level randomization. The randomization by the scheduler may be sufficient to randomly place blocks within the surface of a storage disk in each of the digital storage devices of the respective storage node.

The example may also provide deadline driven scheduling. In such an example, the scheduler of each respective storage node provides deadline-driven data reading and writing across all of the digital storage devices of the respective storage node. A deadline for each block is formed from a time stamp of the last packet contained in the block plus an offset. For deadline-driven retrieval, the offset is the time when the retrieval request was admitted into the system. The deadline-driven retrieval allows data blocks for an outgoing stream to be retrieved in order of their deadlines, and if some deadlines are identical, then in scan order. For deadline-driven writing to a storage device, the offset is determined from the delay that a block is allowed to stay in a main memory buffer until it must output to a digital storage device.

In the example, the gateways also provide random distribution. Each gateway receiving streaming multimedia content data for recording in the system via an assigned session randomly distributes blocks of packets received via the assigned session to each of the storage nodes for processing and storage of the streaming multimedia content data from those packets.

The description below also discusses buffer memory management. For example, the system may include a shared pool of memory buffers for assembly of incoming packets into the data blocks and for the partitioning of retrieved data blocks into outgoing packets.

The teachings herein also encompass methods of receiving, recording, and distributing multimedia content at real-time rates via a packet data network. An example of such a method might entail establishing first sessions between multiple gateways and source client devices, and second sessions between the gateways and receiver client devices, via the packet data network. One of the gateways receives a stream of packets, containing real-time streaming multimedia content data, via each first session through the packet data network. The receiving gateway distributes the packets from the received stream to storage nodes. At each storage node, payload content data from received packets of the stream is distributed across all of the digital storage devices associated with the respective storage node. For each second session, the method involves retrieving the stored content from the storage devices, and transmitting packets containing the retrieved content as a real-time outgoing stream via one of the gateways and one of the second sessions through the packet data network, to at least one of the receiver client devices.

Another disclosed method involves receiving requests to establish sessions for incoming and outgoing streaming media communications, via the packet data network, and assigning sessions to gateways, for establishing first communication sessions through the packet network with source client devices and for establishing second communication sessions through the packet network with receiver client devices. Here, the method also involves receiving a stream of packets containing real-time streaming multimedia content data, via each respective first communication session through the packet data network, at the gateway assigned the respective first session. The appropriate gateway distributes the packets from each received stream to the storage nodes, where the payload content data from the packets is distributed across the digital storage devices associated with the respective storage node. For each respective second session, this method also involves retrieving the stored content from the storage devices, and transmitting packets containing the retrieved content as a real-time outgoing stream via the gateway assigned the respective second session and through the packet data network to at least one of the receiver client devices.

The methods outlined above can support live interactive communications via the recorder/retrieval system. Hence, for at least one of the second communication sessions, the transmitting of the packets containing the retrieved content as the real-time outgoing stream occurs while reception of the particular content data is ongoing via one of the first communication sessions from one of the source client devices. In a video conference example, a stream from one location is received, stored and relayed to one or more other locations for presentation to other participants in real-time, to facilitate live viewing. When the conference provides two-way communication, the parties can view and participate live.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 depicts a RTSP request-response exchange for establishing a recording session, with one audio stream and one video stream. Claims done, and spec OK to here 9:40 pm Sat.

FIG. 4 is a simplified functional block diagram of a server, like the recorder of FIG. 1, and a client device, useful in explaining buffer management.

FIG. 6 is a logic diagram useful in explaining a hierarchy of admission control, as may be implemented in a session manager of the recorder of FIG. 1.

FIG. 9(a) illustrates the data flow involved in placement of data blocks on disk type digital storage devices, using block level randomization (BLR).

FIG. 9(b) illustrates the data flow involved in placement of data blocks on disk type digital storage devices, using packet level randomization (PLR).

DETAILED DESCRIPTION

Figure 1:
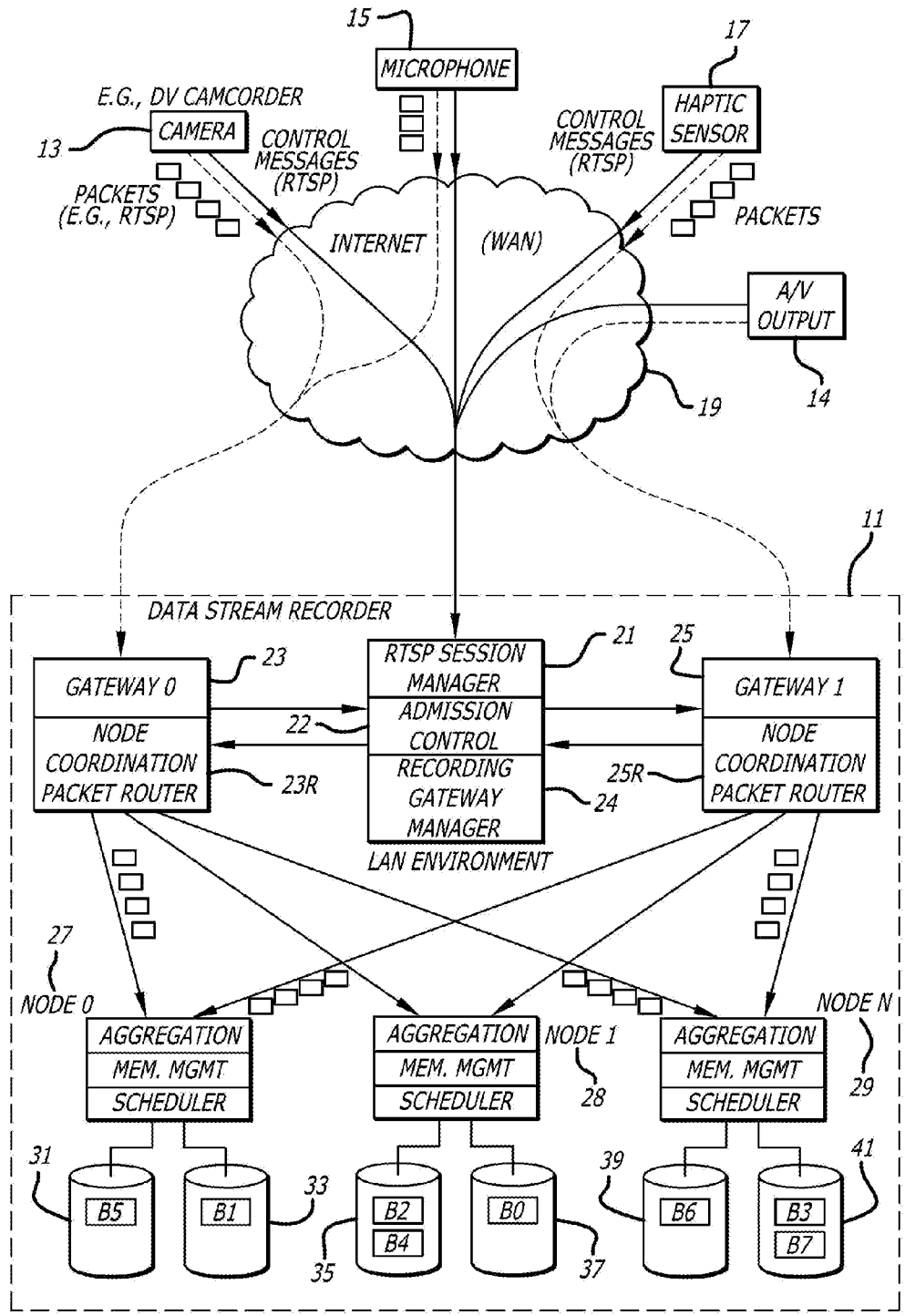
FIG. 1 is a functional block diagram of the architecture of a scalable data stream recorder and some of the devices that may communicate with such a recorder.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

A data stream recorder system is provided, for real-time multi-stream recording, retrieval and control of multimedia content via a packet data network. The exemplary recorder provides a unified architecture that integrates multi-stream recording and retrieval in a coherent paradigm. We term this architecture HYDRA: High-performance Data Recording Architecture. The system is optimized to handle multiple concurrent recording and playback sessions. The system also is configured to handle an array of different types of continuous media content. Table 1 illustrates a sampling of continuous media types with their respective bandwidth requirements.

| Media Type | Specifications | Data Rate (per second) |
|---|---|---|
| CD-quality audio | 2 channels, 16-bit samples at 44,100 kHz | 1.4 Mb/s |
| MPEG-2 encoded video | NTSC-quality (720 × 480) | 4 to 8 Mb/s |
| MPEG-2 encoded video | HDTV-quality (1920 × 1080) | 19.4 Mb/s |
| DV | NTSC-quality (720 × 480) | 25 to 36 Mb/s |
| DVCPRO50 | NTSC-quality (720 × 480) | 50 Mb/s |
| DVCPROHD | HDTV-quality (1920 × 1080) | 100 Mb/s |
| HDCAM | HDTV-quality (1920 × 1080) | 135 Mb/s |

The need for high performance and scalable data stream recorders will arise for many applications. In the discussion of examples below, we will describe an architecture that is flexible, scalable and incorporates solutions to practical issues. We will outline an admission control algorithm that considers the multizoning, the variable seek and rotational latency overhead, and the varying read and write performance of the current generation of disk drives. Additionally, incoming streams with variable bit rate requirements are supported.

The disclosed system with a data stream recorder enables transmission, storage and retrieval (playback) of video at 1280×720 pixel resolution (in HDV) format) at approximately 20 Mb/s over traditional IP networks such as the Internet. For example, an MPEG-2 transport stream video may be acquired from a camera via FireWire, packetized, transmitted and rendered with a software or hardware decoder. Additionally, two or more audio channels may be transmitted with the video content. In the past, achieving this level of media quality required very costly equipment. However, improvements in information technology now permit more cost-effective hardware and hence enable many more interesting applications. This live streaming component is part of the high-performance data recording architecture (HYDRA), which enables new applications by acting as an efficient media stream coordinator that manages the transmission, recording and playback of many different data streams simultaneously. HYDRA aims to provide the same services for all media, independent of their bandwidth requirements, resolution or modality. One of the possible applications for the technology is a Distributed Immersive Performance where musicians and audiences are geographically dispersed in different locations. We will also outline additional issues such as the main memory buffer management with a unified pool of buffers, synchronization of multiple streams and the write deadline determination of incoming data.

Reference now is made in detail to the examples illustrated in the accompanying drawings and discussed below.

Architecture Design

FIG. 1 illustrates the architecture of a scalable data stream recorder 11 operating in an Internet Protocol (IP) network environment. Multiple, geographically distributed sources, for example video cameras 13, microphones 15, and other sensors 17, acquire data in real time, digitize it and send it to the stream recorder. Although shown as only input devices, those skilled in the art will recognize that these sources are implemented as client devices capable of processing and packet data communication, e.g. as computers not shown with appropriate interfaces to the input device(s). We assume that each of the source client devices at 13, 15 and 17 includes a network interface and that the data streams are transmitted in discrete packets. One or more receiver client devices 14 will receive packets from the recorder system 11, for processing of the continuous media content data and presentation thereof to a user via an appropriate audio and/or video (A/V) output device.

A suitable protocol for audio and video data traffic would be the Real-time Transport Protocol (RTP) on top of the Universal Datagram Protocol (UDP). The client-recorder dialog that includes control commands such as record, pause, resume, and stop is commonly handled via the Real-time Streaming Protocol (RTSP). The sources communicate packets to/from the recorded via a network, such as the wide area network (WAN) commonly known as the Internet 19.

The data stream recorder 11 includes two interfaces to interact with data sources: (1) a session manager 21 to handle RTSP communications, and (2) multiple recording gateways 23, 25 to receive RTP data streams. A data source connects to the recorder 11 by initiating an RTSP session with the session manager 21.

The session manager 21 utilizes general purposes computer hardware (one or more PCs, servers or other computer platforms) having appropriate Internet connectivity and local area network connectivity for communications within the data stream recorder 11. In addition to the software implement the function of the session manager, the computer platform running the session manager 21 also runs programming 22 for admission control and programming 24 for gateway management. Gateway management and admission control are discussed in more detail, later. In this way, the session manager 21 performs the following functions within the environment of the recorder system 11: (1) admission control for new streams, (2) maintaining RTSP sessions with sources, and (3) managing the recording gateways 23, 25. As part of the session establishment, the data source receives detailed information about which recording gateway will handle its data stream. Media packets are then sent directly to this designated gateway, bypassing the manager 21.

The utilization of multiple recording gateways within each stream recorder 11, provides scalability to a large number of concurrent streams and removes the bottleneck caused by having a single entry point for all packets containing data to be recorded within the system. Although two gateways 23, 25 are shown in the example, for convenience, there may be more such gateways.

The typical recording gateway hardware consists of a computer with two high-speed network interfaces. One interface is connected to the network 19 (for example the Internet) with the source and receiver client devices 13-19. The second network interface is used for communication with the gateway manager 24 and storage nodes within the recorder system 11. The latter type of communication will normally be provided through a high-speed LAN.

The recording gateway functionality is implemented in a collection of software modules that are executed in real-time. Each recording gateway 23 or 25 performs the following functions: (a) handling of errors during transmissions, (b) time stamping of packets, (c) packet-to-storage-node assignment and routing, and (d) storage node coordination and communication. Although router hardware could be provided, in the example, the communications to/from the storage nodes is implemented as node coordination and packet router programming 23R, 25R running on the computer that implements the respective gateway functionality 23, 25.

A recording gateway 23 or 25, handling the stream of incoming continuous media content for a particular recording session, forwards distributes incoming data packets from that stream to the storage nodes available within the particular recorder system 11. The recorder 11 includes a number N, that is to say one or more of the storage nodes. In the example there are three such nodes 27, 28 and 29, although there may be only two or more often there will be higher numbers of nodes. Each storage node is a general purpose commuter connected to the LAN in the system 11, which manages one or more local disk storage devices. In the example each node manages two disk devices. Hence, storage node 0 (27) manages disk storage devices 31 and 32. The storage node 1 (28) manages disk storage devices 35 and 37; and the storage node N (29) manages disk storage devices 39 and 41. Although other storage technologies may be used, for purposes of discussion, the examples use magnetic disk-type devices.

The computer implementing each storage node runs software for aggregation and segregation of content data from and to packets, as well as memory management and scheduler software. Those skilled in the art will recognize that the functions of the node, e.g. the scheduler and storage devices may utilize different combinations of software and hardware. Hence, the functions performed in the storage nodes include (i) packet-to-block (P2B) aggregation, (ii) memory buffer management, (iii) block data placement on each storage device, (iv) real time disk head scheduling, and (v) retrieval scheduling for outgoing streams.

As will be apparent from the above discussion of the architecture, aspects of the techniques discussed herein encompass hardware and programmed equipment as well as software programming, for performing the relevant functions of the HYDRA type system 11. The components contained within the computers used to implement the various elements of the system 11 are those typically found in general purpose computer systems used as servers, workstations, personal computers, network terminals, and the like. In fact, these computers and their components are intended to represent a broad category of such equipment that is well known in the art. The hardware elements operating systems and programming languages of such servers are conventional in nature, and it is presumed that those skilled in the art are adequately familiar therewith.

A software or program product may take the form of code or executable instructions for causing a computer or other programmable equipment to perform the relevant steps, where the code or instructions are carried by or otherwise embodied in a medium readable by a computer or other machine. Instructions or code for implementing such operations may be in the form of computer instruction in any form (e.g. source code, object code, interpreted code, etc.) stored in or carried by any readable medium. Such a medium may take many forms, including but not limited to non-volatile media, volatile media, and transmission media. Non-volatile media include, for example, optical or magnetic disks, such as typically used to implement any of the digital storage devices storage nodes of the system 11. Volatile media include dynamic memory, such as typically used to implement main memory in any of the relevant computers. Transmission media include coaxial cables; copper wire and fiber optics including the wires that comprise a bus within a computer system. Transmission media can also take the form of electric or electromagnetic signals, or acoustic or light waves such as those generated during radio frequency or infrared data communications. In addition to storing programming in network or system elements, various forms of computer readable media may be involved in carrying one or more sequences of one or more instructions to a processor for execution, for example, to install appropriate software or upgrades thereof in the session manager platform, any of the gateway platforms or in any of the storage nodes of the system 11.

The following is a summary some of the features of the illustrated architecture of the data stream recorder system 11 for real-time multi-stream recording, retrieval and control of multimedia content via a packet data network.

1) Multi-node, multi-disk cluster architecture to provide scalability.
2) Multiple recording gateways to avoid bottlenecks due to single-point recording.
3) Random data placement for the following operations: block-to-storage node assignment, block placement within the surface of a single disk and optionally packet-to-block assignment. These result in the harnessing of the average transfer rate for multizone disk drives and improves scalability.
4) Unified model for disk scheduling: deadline-driven data reading and writing (fixed block sizes reduce complexity of file system).
5) Unified memory management with a shared buffer pool for both reading and writing.
6) Statistical admission control to accommodate variable bit rate (VBR) streams and multizone disk drives.

We will now discuss each function in turn. The discussion of the admission control algorithm is deferred, because it is an overarching component that relies on many of the other concepts which will be introduced first.

Session Management

The Real-Time Streaming Protocol (RTSP) provides a well defined set of commands for managing recording sessions. FIG. 2 shows a sample RTSP request-response exchange for establishing a recording with one audio and one video stream. Once an RTSP session is successfully set up, the session manager 21 informs the recording gateways 23, 25 of session details such as port numbers, expected bandwidth, etc.

The gateway manager 24 coordinates the stream load among the different recording gateways 23 and 25, which are the media stream entry points into the recorder 11. Each gateway 23 or 25 keeps track of its own resource utilization (for example the network bandwidth, the CPU utilization and the memory utilization). As part of the stream admission control function 22, the gateway manager 24 is aware of the resource utilization and the current workload of every gateway. A newly entering stream must announce how much bandwidth it expects to use, and the gateway manager 24 will assign it to the most appropriate gateway 23 or 25 through a dynamic load balancing algorithm. In turn, the assigned gateway will allocate the necessary resources to the incoming stream, so that there is no loss of data because of resource over-utilization. The session manager 21 works in conjunction with the gateway manager 24 and informs a gateway 23 or 25 whenever a new stream is assigned to it (gateways ignore packets that do not have a recognized session ID). If a session is paused, resumed or stopped, the gateway is also notified by the session manager 21. The gateway and the managers will typically be implemented as real-time software components executing on a networked computer.

Recording Gateway Management

The recording gateways 23, 25 are the media stream entry points into the recorder 11. Each gateway maintains its own available network bandwidth. Different streams are assigned to different gateways 23, 25 based on the current workload and the resources available. The session manager 21 informs a gateway 23 or 25, whenever a new stream is assigned to it.

Gateways ignore packets that do not have a recognized session ID. If a session is paused, resumed or stopped, the serving gateway is also notified by the session manager 21.

As part of the stream admission control, the session manager 21 is aware of the resource utilization of every gateway. A newly entering stream must announce how much bandwidth it expects to use, and the session manager 21 will assign it to the most appropriate gateway. In turn, the assigned gateway 23 or 25 will allocate the necessary resources to the incoming stream so that there is no loss of data because of resource over-utilization.

Transmission Error Recovery

The recorder architecture accepts data in the form of RTP packets, which are usually based on UDP datagrams. UDP is a best-effort delivery mechanism and does not provide any guarantees to ensure packet delivery. Since we may be recording content from an original source, lost packets are not acceptable as they will be permanently missing from the stored data. There are a number of methods to minimize losses during packet transmission, such as Forward Error Control (FEC) and Retransmission Based Error Control (RBEC). There are tradeoffs between the different techniques in terms of the overhead and delay introduced. As an alternative, the reliable TCP protocol guarantees packet delivery, however it is usually not suitable for real-time traffic.

We address this challenge in the exemplary recorder system 11 with a two-pronged approach as follows. The original RTP packets are acquired at the server and made available for playback immediately. Therefore, live monitoring of sources can be accomplished with minimal end-to-end delay. At the same time, the source client devices contain a sliding buffer of the most recent data, such that a retransmission scheme can be used to effectively close the "holes" (missing packets) in the stored data after a slight delay. Hence, the system 11 can support applications that do not tolerate any missing data in their archived streams (e.g., medical imaging). We are also considering an adaptive hybrid approach where a minimal FEC is applied as the first tier and retransmissions are used as a second tier. To allow missing packets to be retransmitted and hence data gaps to be filled will also require that data blocks be kept in memory long enough, before they are flushed to persistent storage. Therefore, the write deadlines need to be adjusted accordingly and coordination with the memory manager is required. The goal is to achieve a network-friendly protocol that is both flexible and provides high performance.

Packet Time Stamping

In the example, the gateway serving a recording session also functions to time stamp incoming media packets accurately.

With continuous data streams, packets need to be time stamped such that the temporal relationship between different parts of a stream can be preserved and later reproduced (intra-stream synchronization). Such time stamps also help to establish the synchronization between multiple streams (inter-stream synchronization).

Packets may be time stamped directly at the source. In that case, intra-stream synchronization will not be affected by any network jitter that a stream experiences during its network transmission to the recorder. However, inter-stream synchronization with other data originating from geographically different locations requires precise clock synchronization of all locations. One possible solution is to use clock information from GPS (Global Positioning System) receivers, if very precise timing is needed (e.g. on the order of microseconds). For synchronization on the order of tens of milliseconds, a solution such as the network time protocol (NTP) may suffice.

If packets are time stamped once they reach the data recorder, then the temporal relationship is established between packets that arrive concurrently. Hence, if stream A has a longer transmission time than stream B, the time difference will be implicitly recorded; and if the transmission delays are not identical during playback, then any combined rendering of A+B will be out-of-sync. Furthermore, with this approach any packet jitter that was introduced by the network will be permanently recorded as part of the stream.

In the illustrated architecture, it is possible to record both types of time stamps whenever possible, to allow maximum flexibility during playback. In the software implementation, we address the synchronization challenges on two levels. First, the media server engine functionality of the gateway 23 or 25 is augmented with end-to-end time code support, i.e., from packet generation to block storage. The scheduling mechanism in the storage nodes for retrievals is modified to allow disk retrievals at specific times relative to each other. However, synchronized disk block retrieval is no guarantee that the end user display will be synchronized as well, especially in the face of network jitters as is common on the Internet. Hence a feedback control mechanism in the gateways and a VBR stream smoothing protocol ensures that synchronization is maintained in a distributed environment and at the rendering locations.

Packet-to-Block Aggregation

We discuss packet-to-block aggregation before the packet-to-storage-node assignment, even though the two steps happen in reversed order in the actual system. However, we believe that from a conceptual point of view the discussion will be easier to understand.

Figure 3A:
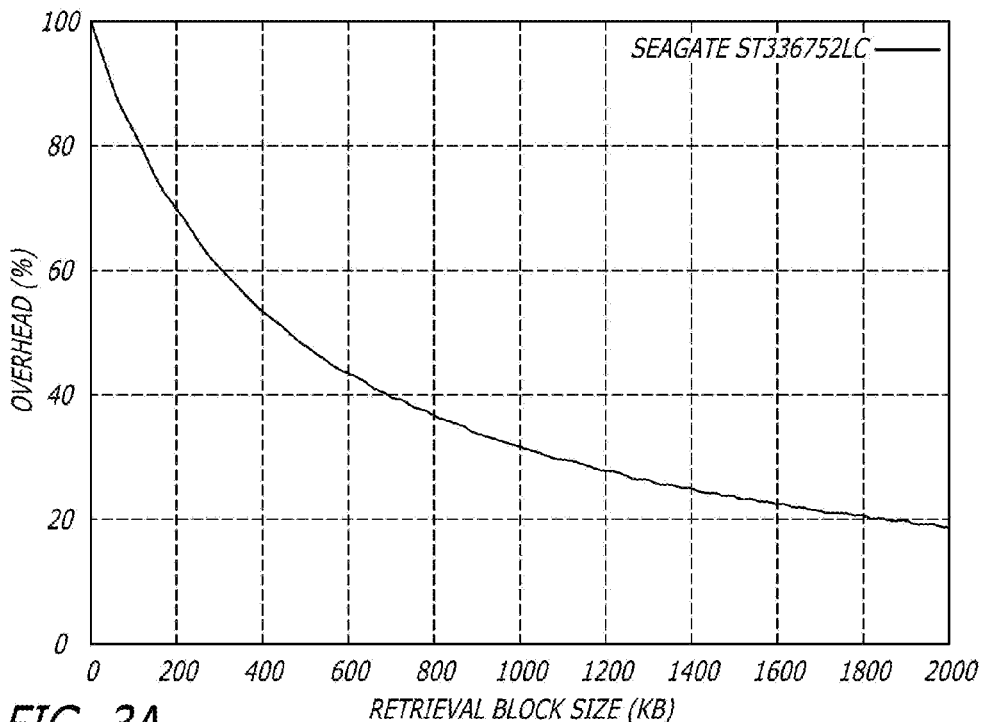
FIG. 3(a) is a graph showing the relative overhead experienced with a current generation disk drive, as a function of the retrieval block size.

Packet-switched networks such as the Internet 19 generally use relatively small quanta of data per packet (for example 1400 bytes). On the other hand magnetic disk drives operate very inefficiently when data is read or written in small amounts. This is due to the fact that disk drives are mechanical devices that require a transceiver head to be positioned in the correct location over a spinning platter before any data can be transferred. FIG. 3(a) shows the relative overhead experienced with a current generation disk drive (Seagate Cheetah X15) as a function of the retrieval block size. The disk parameters used are shown in Table 2.

| Model | ST336752LC |
| Series | Cheetah X15 |
| Manufacturer | Seagate Technology, LLC |
| Capacity C | 37 GB |
| Transfer rate $R_D$ | See FIG. 3 |
| Spindle speed | 15,000 rpm |
| Avg. Rotational latency | 2 msec |
| Worst case seek time | ≈7 msec |
| Number of Zones Z | 9 |

The overhead was calculated based on the seek time needed to traverse half of the disk's surface plus the average rotational latency. As illustrated, only large block sizes beyond one or two megabytes allow a significant fraction of the maximum bandwidth to be used (the fraction is also called effective bandwidth). Consequently, incoming packets need to be aggregated into larger data blocks for efficient storage and retrieval. There are two ways this can be accomplished.

Sequential: With this scheme, incoming packets are aggregated in sequence into blocks. For example, if m packets fit into one block then the receiver routing algorithm will send m sequential packets to one storage node, e.g., 27, 28 or 29 in the exemplary recorder 11, before selecting another node as the target for the next m packets. As a result, each block contains sequentially numbered packets. The advantage of this technique is that only one buffer at a time per stream needs to be available in memory across all the storage nodes. The buffer memory may reside in the computers providing the management at the respective storage nodes, controlled as part of the memory management functionality. A pool of buffers also may be provided in each of the gateways.

Random: With this scheme, each incoming packet is randomly assigned to one of the storage nodes, where they are further collected into blocks. One advantage of this technique is that during playback data is sent randomly from all storage nodes at the granularity of a packet. Therefore, load-balancing is achieved at a small data granularity. The disadvantage is that in the computer(s) implementing the node control and management functions, the memory management software needs to allocate one buffer in the node memory per stream. Furthermore, the latency until the first data block can be written to a storage device is about N times longer than in the sequential case, where N is the number of storage nodes.

Generally, the advantage of needing only 1/N times the memory for the sequential case outweighs the load balancing advantages of the random technique. When many streams are retrieved simultaneously, load balancing with the sequential approach (i.e., at the granularity of a block) should be sufficient.

Random placement of data blocks has been proven to be an effective approach to balance heterogeneous workload in multi-disk steaming architectures. However, the main disadvantage of this technique is that statistical variation can still result in short term load imbalances in disk utilization. We propose a packet level randomization (PLR) technique to solve this challenge. We quantify the exact performance trade-off between PLR approach and the traditional block level randomization (BLR) technique through both theoretical analysis and extensive simulation. Our results show that the PLR technique can achieve much better load balancing in scalable streaming architectures by using more memory space.

Packet-switched networks such as the Internet transmit relatively small quanta of data per packet (for example 1400 bytes). On the other hand, magnetic disk drives operate very inefficiently when data is accessed in small amounts. This is due to the fact that disk drives are mechanical devices that require a transceiver head to be positioned in the correct location over a spinning platter before any data can be transferred. The seek time and rotational latency are wasteful. Consequently, media packets need to be aggregated into larger data blocks for efficient storage and retrieval. Traditionally this is accomplished as follows.

Media packets are aggregated in sequence into blocks (see FIG. 9(a)). For example, if m packets fit into one block then the data distribution algorithm will place the first m sequential packets into block X0, the next m packets into block X1, and so on. As a result, each block contains sequentially numbered packets. Blocks are then assigned randomly to the available disk drives. During retrieval, the deadline of the first packet in each block is essentially the retrieval deadline for the whole block. The advantage of BLR is that only one buffer at a time per stream needs to be available in memory across all the storage nodes. In order to allow high disk utilization while still reducing the probability of hot-spots we propose a novel technique as follows.

Each media packet is randomly assigned to one of the storage nodes, where they are further collected into blocks (FIG. 9(b)). One advantage is that during playback data is retrieved randomly from all storage nodes at the granularity of a packet. Therefore, load-balancing is achieved at a very small data granularity. The disadvantage is that memory buffers need to be allocated concurrently on all nodes per stream.

The difference between the BLR and PLR techniques are illustrated in FIGS. 9(a) and 9(b). With the traditional BLR technique, packets are first aggregated into blocks D1. Hence, packets appear in sequence in each block D2 (here a block consists of three packets). Subsequently, the blocks are randomly assigned to the storage nodes. With PLR however, the randomized assignment of packets to the storage nodes takes place first at E1. Packets are aggregated into blocks at each storage node individually E2, and hence packets appear out of sequence in each block E3.

Block-to-Storage-Node Assignment

To present a single point of contact for each streaming source, packets are collected at a recording gateway as indicated earlier. However, to ensure load balancing, these packets need to be distributed across all N the storage nodes. Storing individual packets is very inefficient and hence they need to be aggregated into larger data blocks as described later.

Once the data is collected into blocks, there are two basic techniques to assign the data blocks to the magnetic disk drives 31 to 41 that form the storage system: in a round-robin sequence, or in a random manner. Traditionally, the round-robin placement utilizes a cycle-based approach to scheduling of resources to guarantee a continuous display, while the random placement utilizes a deadline-driven approach. There has been extensive research investigating both techniques in the context of continuous media stream retrievals. The basic characteristics of these techniques still apply with a mixed workload of reading and writing streams.

In general, the round-robin/cycle-based approach provides high throughput with little wasted bandwidth for video objects that are stored and retrieved sequentially (e.g., a feature length movie). Block retrievals can be scheduled in advance by employing optimized disk scheduling algorithms during each cycle. Furthermore, the load imposed by a display is distributed evenly across all disks. However, the initial start-up latency for an object might be large under heavy load because the disk on which the starting block of the object resides might be busy for several cycles. Additionally, supporting variable bit rate (VBR) streams and interactive operations, such as pause and resume, are complex to implement. The random/deadline-driven approach, on the other hand, naturally supports interactive functions and VBR streams. Furthermore, the start-up latency is generally shorter, making it more suitable for a real time stream recorder.

Block Size: The block size to use in a continuous media server is usually determined in one of two ways: (a) the block size represents a constant data length (CDL) or (b) the block size represents a constant time length (CTL). With CTL the size in bytes varies if the media stream is encoded with a variable bit rate. Conversely, with CDL the amount of playback time per block is variable. A system that utilizes a cycle-based scheduling technique works well with CTL whereas a deadline-driven system can use either approach. For an actual implementation, the fixed block size of CDL makes the design of the file system and buffer manager much easier. Hence, a CDL design with random placement and deadline-driven scheduling provides an efficient and flexible platform for recording and retrieving streams.

Memory Buffer Management

Managing the available memory efficiently is a crucial aspect of any multimedia streaming system. A number of studies have investigated buffer/cache management. These techniques can be classified into three groups: server buffer management, network/proxy cache management and client buffer management. FIG. 4 illustrates where memory resources are located in a distributed environment.

In a client-server architecture, memory buffers are located both at the server side (F1) and at the client side (for example a playback client device F3 and a recording client device F4). Additional memory buffers may exist within the network infrastructure F2. However, these buffers appear opaque to end user applications and cannot be utilized as part of the streaming media recording and playback architecture.

When designing an efficient memory buffer management module for a large scale data stream recorder, we may classify the problems of interest into two categories: (1) resource partitioning and (2) performance optimization. In the resource partitioning category, a representative class of problems are—What is the minimum memory or buffer size that is needed to satisfy certain streaming and recording service requirements? The requirements usually depend on the quality of service expectations of the end user or application environment. In the performance optimization category, a representative class of problems are—Given certain amount of memory or buffer, how to maximize our system performance in terms of certain performance metrics? Some typical performance metrics are as follows:

The assembly of incoming packets into data blocks and conversely the partitioning of blocks into outgoing packets requires main memory buffers. In a traditional retrieval-only server, double buffering is often used. One buffer is filled with a data block that is retrieved from a disk drive while the content of the second buffer is emptied (i.e., streamed out) over the network. Once the buffers are full/empty their roles are reversed. In a retrieval-only system, more than two buffers per stream are not necessary. However, if additional buffers are available, they can be used to keep data in memory longer such that two or more streams of the same content, started at just a slight temporal offset, may share the data. As a result, only one disk stream is consumed and more displays can be supported.

With a stream recorder, double buffering is still the minimum that is required. However, with additional buffers available, incoming data can be held in memory longer and the deadline by which a data block must be written to disk can be extended. This can reduce disk contention and hence the probability of missed deadlines (see W. Aref, I. Kamel, T. N. Niranjan, and S. Ghandeharizadeh, "Disk Scheduling for Displaying and Recording Video in Non-Linear News Editing Systems," *Proceedings of the Multimedia Computing and Networking* Conference, pages 228-239, San Jose, Calif., February 1997). SPIE Proceedings Series, Volume 3020 introduced an analytical model to calculate the write deadline of a block as a function of the size of the available buffer pool. However, their model does not use a shared buffer pool between readers and writers. In a large scale stream recorder the number of streams to be retrieved versus the number to be recorded may vary significantly over time. Furthermore, the write performance of a disk is usually significantly less than its read bandwidth (see FIG. 3(b)). These factors should be considered in the design model for the memory buffer management module.

Data Placement on the Disk Platters

The placement of data blocks on a magnetic disk has become an issue for real time applications since disk manufacturers have introduced multizoned disk drives. A disk drive with multiple zones partitions its space into a number of regions that each have a different number of data sectors per cylinder. The purpose of this partitioning is to increase the storage space and allocate more data to the outer regions of a disk platter as compared with the inner regions. Because disk platters spin at a constant angular velocity (e.g., 10,000 revolutions per minute), this results in a data transfer rate that is higher in the outer zones than it is in the inner ones.

Consequently, the time to retrieve or store a data block varies and real time applications must handle this phenomenon. A conservative solution is to assume the slowest transfer rate for all regions. As a result the scheduler in the storage node 27, 28 or 29 need not be aware of the location where a block is to be stored or retrieved. However, this approach might waste a significant fraction of the possible throughput. The transfer rate ratio between the innermost and outermost zones sometimes exceeds a factor of 1.5.

A number of techniques have been proposed to improve the situation and harness more of a disk's potential, which all attempt to utilize the average transfer rate instead of the minimum. These approaches were designed to work with deterministic scheduling techniques with the assumption that every block access must not exceed a given time span.

However, in the context of random assignments of blocks to disks and stochastic, dead-line driven scheduling this assumption can be relaxed. By randomly placing blocks into the different zones of a disk drive the average transfer rate can easily be achieved. However, now the block retrieval times vary significantly. By observing that the retrieval time is a random variable with a mean value and a standard deviation we can incorporate it into the admission control module such that an overall statistical service guarantee can still be achieved. An advantage of the random block-to-zone data placement is its simplicity and the elegance of using the same random algorithm both within a disk and across multiple disks.

Real Time Disk Head Scheduling

Recall that the effective bandwidth of a magnetic disk drive depends to a large degree on the overhead (the seek time and rotational latency) that is spent on each block retrieval. The effect of the overhead can be reduced by increasing the block size. However, this will result in a higher memory requirement. Conversely, we can lower the overhead by reducing the seek time. Disk scheduling algorithms traditionally achieve this by ordering block retrievals according to their physical locations and hence minimize the seek distance between blocks. However, in real time systems such optimizations are limited by the requirement that data needs to be retrieved in a timely manner.

In a multimedia server that utilizes random data placement, dead-line driven scheduling is a well suited approach. Furthermore, for a system that supports the recording and retrieval of variable bit rate streams, dead-line driven scheduling is an efficient way with medium complexity. Cycle-based scheduling becomes very complex if different media types are to be supported that require fractional amounts of blocks per round to be accessed.

The deadline-driven retrieval allows data blocks for an outgoing stream to be retrieved in order of their deadlines, and if some deadlines are identical, then in scan order. The "scan order" refers to the disk head movement across a disk platter. To minimize the seek time between block retrievals, blocks with identical deadlines will be picked up in the order in which they pass under the disk head moving from the outermost track to the innermost (or vice versa).

For example, the SCAN-EDF algorithm (see A. L. Narashimha Reddy and James C. Wyllie, "Disk Scheduling in a Multimedia I/O System," *Proceedings of the ACM Multimedia Conference*, pages 225-233, Anaheim, Calif., August 1993) combines earliest-deadline-first disk head scheduling with a scan optimization. Data blocks are retrieved in order of their deadlines and if some deadlines are identical then the scan order is used. The deadline of a block can be obtained from the time stamp of the last packet that it contains plus an offset. For data retrieval, the offset is commonly the time when the retrieval request was admitted into the system. For stream writing, the offset needs to be determined from the delay that a block is allowed to stay in a main memory buffer until it must be flushed to a physical disk drive. The SCANRT-RW algorithm (see W. Aref, I. Kamel, T. N. Niranjan, and S. Ghandeharizadeh, "Disk Scheduling for Displaying and Recording Video in Non-Linear News Editing Systems," *Proceedings of the Multimedia Computing and Networking Conference*, pages 228-239, San Jose, Calif., February 1997; and SPIE Proceedings Series, Volume 3020) treats both read and writes in a uniform way and computes the writing deadlines based on the amount of buffer memory available. However, it assumes a partitioned buffer pool where some space is allocated exclusively for writing. It should be investigated how a unified buffer pool affects the scheduling performance.

Admission Control

The task of the admission control algorithm implemented in the software 22 is to ensure that no more streams are admitted than the system can handle with a predefined quality. A number of studies have investigated admission control techniques in multimedia server designs. FIG. 6 classifies these admission control techniques into two categories: measurement-based control C1 and parameter-based control C2. The parameter-based approach can be further divided into deterministic control and statistical control algorithms C21 and C22, respectively.

With measurement-based algorithms, the utilization of critical system resources is measured continually and the results are used in the admission control module. Measurement-based algorithms can only work online and cannot be used to offline configure a system or estimate its capacity. Furthermore, it is difficult to obtain an accurate estimation of dynamically changing system resources. For example, the time window during which the load is measured influences the result. A long time window smoothes out load fluctuations but may overlap with several streams being started and stopped, while a short measurement interval may over or underestimate the current load.

Figure 5A:
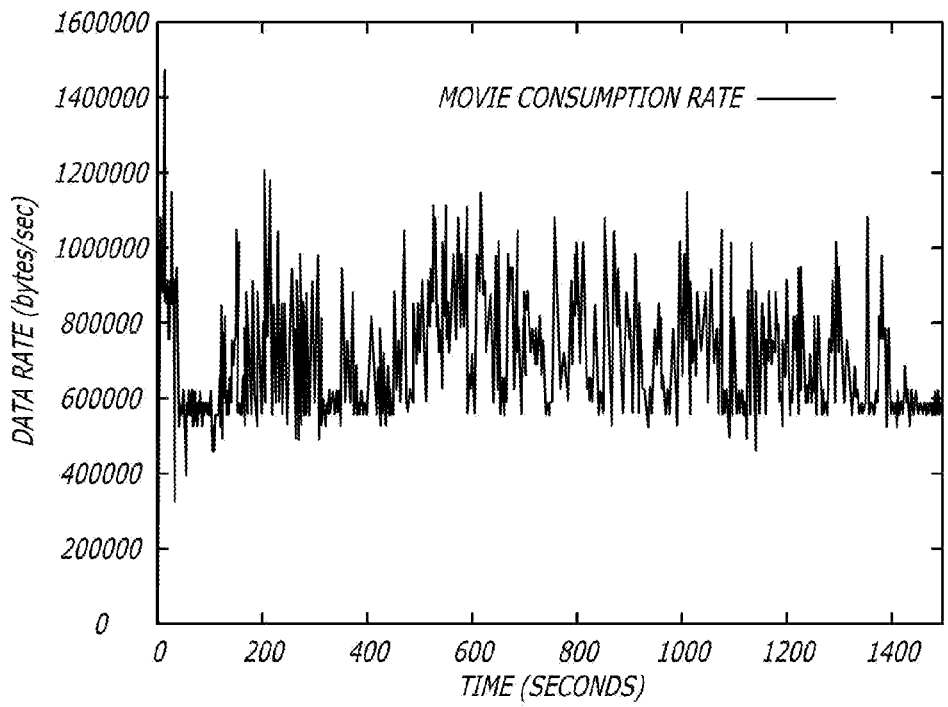
FIG. 5(a) is a graph of the data rate.
Figure 5B:
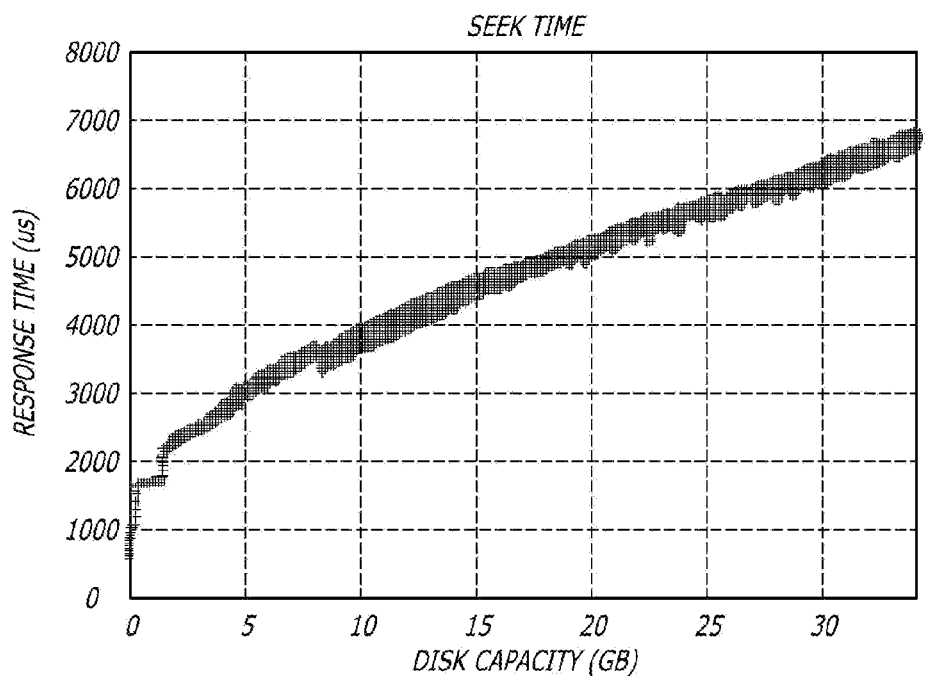
FIG. 5(b) graphically depicts the response time.

With deterministic admission control the worst case must be assumed for the following parameters: stream bandwidth requirements, disk transfer rate and seek overhead. Because compressed streams, such as MPEG-2, may require quite variable bit rates (see FIG. 5(*a*)) and the disk transfer rates of today's multizoned disk drives also vary by a factor of up to 1.5-to-1, assuming worst case parameters will result in a significant underutilization of resources in the average case. Furthermore, if an operating system without real time capabilities is used service guarantees may be violated even with conservative calculations. Consequently, for a more practical approach we focus on statistical admission control where service is guaranteed with a certain probability to not exceed a threshold requested by the user.

Next, we describe the statistical admission control algorithm used in our examples. The algorithm, called TRAC (Three Random variable Admission Control), models a much more comprehensive set of features of real time storage and retrieval than previous work. For example, this approach provides support for variable bit rate (VBR) streams (FIG. 3*a* illustrates the variability of a sample MPEG-2 movie). The TRAC control algorithm also offers support for concurrent reading and writing of streams. The distinguishing issue for a mixed workload is that disk drives generally provide less write than read bandwidth (see FIG. 3b). Therefore, the combined available bandwidth is a function of the read/write mix. We propose a dynamic bandwidth sharing mechanism as part of the admission control.

Figure 3B:
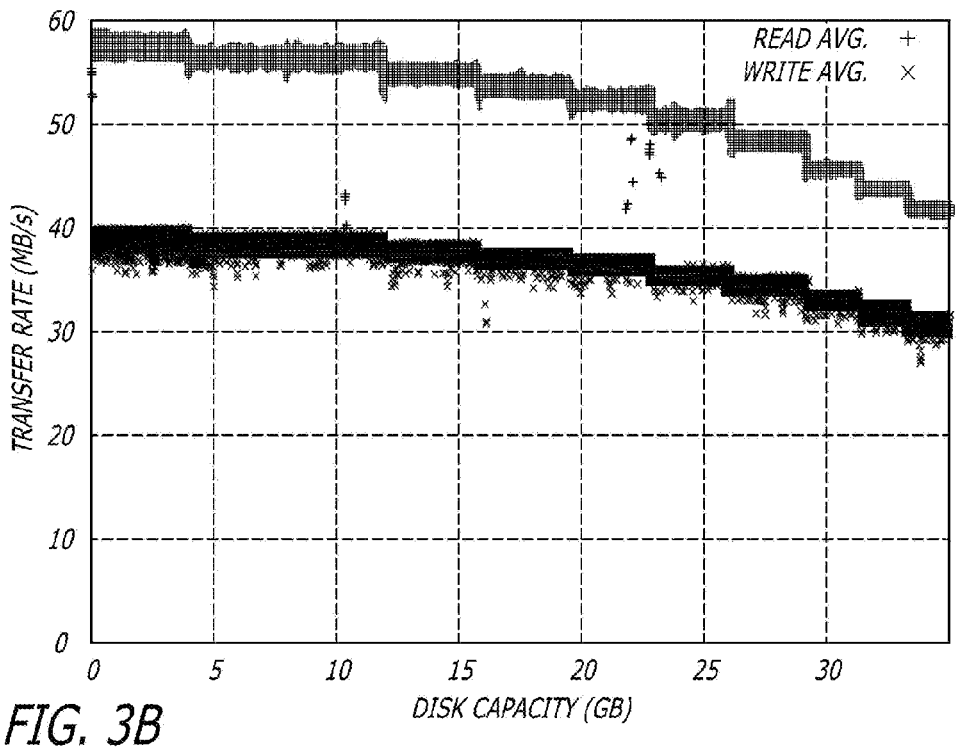
FIG. 3(b) graphically depicts the transfer rate versus disk capacity.

As another feature, TRAC type control provides support for multi-zoned disks. FIG. 3b illustrates that the disk transfer rates of current generation drives is platter location dependent. The outermost zone provides up to 30% more bandwidth than the innermost one. Modeling of the variable seek time and variable rotational latency that is naturally part of every data block read and write operation. TRAC also offers efficient random data placement.

Consider a server recording n variable bit rate streams using deadline-driven scheduling and movie blocks are allocated to disks using a random placement policy. The server activity is observed over time intervals with duration $T_{svr}$. Our model is characterized by three random variables: (1) $D(i)$ denotes the amount of data to be retrieved or recorded for client i during observation window $T_{svr}$, (2) $\overline{R_{Dr}}$ denotes the average disk read bandwidth during $T_{svr}$ with no bandwidth allocation to writing, and (3) $\overline{t_{seek}}$ denotes the average disk seek time during each observation time interval $T_{svr}$.

Let $T_{seek}(i)$ denote the disk seek time for client i during $T_{svr}{}^1$. Let $n_{rs}$ and $n_{ws}$ denote the number of retrieval and recording streams served respectively, i.e., $n=n_{rs}+n_{ws}$. Also, $\hat{R}_{Dr}$ represents the average disk bandwidth (in MB/s) allocated for writing during $T_{svr}$, while $\hat{R}_{Dr}$ represents the average bandwidth for reading. With such a mixed load of both retrieving and recording clients, the average combined disk bandwidth $\overline{R_{Dio}}$ is constrained by $\overline{R_{Dio}}=\hat{R}_{Dr}+\hat{R}_{Dw}$. Consequently, the maximum amount of data that can be read and written during each interval $T_{svr}$ can be expressed by $$\overline{R_{Dio}} \times \left( T_{svr} - \sum_{i=1}^{n_{rs}+n_{ws}} T_{seek}(i) \right).$$

Furthermore, if $$\sum_{i=1}^{n} D(i)$$

represents the total read and write bandwidth requirement during $T_{svr}$ from all streams n, then the probability of missed deadlines, $p_{iodisk}$, can be computed by Eq. 1.

$$p_{iodisk} = P\left[ \sum_{i=1}^{n} D(i) > \left( \overline{R_{Dio}} \times \left( T_{svr} - \sum_{i=1}^{n} T_{seek}(i) \right) \right) \right] \quad (1)$$

Note that a missed deadline of a disk access does not necessarily cause a hiccup for the affected stream because data buffering may hide the delay. However, we consider the worst case scenario for our computations.

Recall that $$\sum_{i=1}^{n} T_{seek}(i)$$

denotes the total seek time spent for all n clients during $T_{svr}$.

Let $t_{seek}(j)$ denote the seek time for disk access j, where j is an index for each disk access during $T_{svr}$. Thus, the total seek time can be computed as follows $$\sum_{i=1}^{n} T_{seek}(i) = \sum_{j=1}^{m} t_{seek}(j) = m \times \overline{t_{seek}} \quad (2)$$

where m denotes the number of seeks and $\overline{t_{seek}}$ is the average seek time, both during $T_{svr}$. Because every seek operation is followed by a data block read or write, m can also be expressed by $$m = \frac{\sum_{i=1}^{n} D(i)}{B_{disk}},$$

where $B_{disk}$ is the block size. With the appropriate substitutions we arrive at our final expression for the probability of over-committing the disk bandwidth, which may translate into missed I/O deadlines.

$$p_{iodisk} = P\left[ \sum_{i=1}^{n} D(i) > \left( \frac{\overline{R_{Dio}} \times T_{svr}}{1 + \frac{\overline{t_{seek}} \times R_{Dio}}{B_{disk}}} \right) \right] \leq p_{req} \quad (3)$$

Because of space constraints we do not include all the equations that produce the final calculation of the stream disruption probability (for detailed discussions, see). Rather, we include some of the experimental results that we obtained with a Seagate Cheetah X15 disk drive (see Table 3 for parameter values).

| Parameters | Configurations |
| --- | --- |
| Test movie "Twister" | MPEG-2 video, AC-3 audio |
| Average bandwidth | 698594 Bytes/sec |
| Length | 50 minutes |
| Throughput std. dev. | 140456.8 |
| Test movie "Saving Private Ryan" | MPEG-2 video, AC-e audio |
| Average bandwidth | 757258 Bytes/sec |
| Length | 50 minutes |
| Throughput std. dev. | 169743.6 |
| Test movie "Charlie's Angels" | MPEG-1 video, Stereo audio |
| Average bandwidth | 189129 Bytes/sec |
| Length | 70 minutes |
| Throughput std. dev. | 56044.1 |
| Disk Model | Seagate Cheetah X15 (Model ST336752LC) |
| Mixed-load factor α | 1.0 (retrieval only experiments) 0.0 (recording only experiments) 0.4094 (retrieval and recording mixed experiments) |
| Relationship factor β (between $R_{Dr}$ and $R_{Dw}$) | 0.6934 |
| Mean inter-arrival time λ of streaming request | 5 seconds |
| Server observation window $T_{svr}$ | 1 second |
| Disk block size $B_{disk}$ | 1.0 MB |

-continued

| Parameters | Configurations |
|---|---|
| Number of disks (ξ) | 1, 2, 4, 8, 16, ..., 1024 |

Figure 7A:
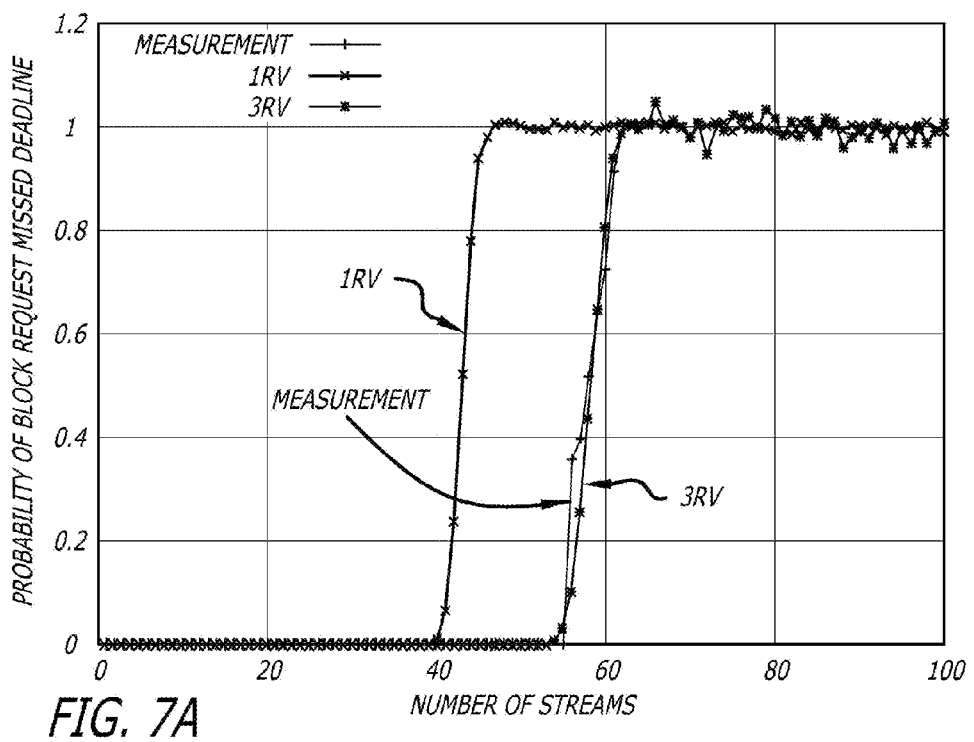
FIG. 7(a) to 7(d) are graphs of depict experimental performance results for retrieval ((a) and (c)) and recording ((b) and (d)), for two different movies used as test samples of continuous media content data.

FIG. 7(a) shows the measurement and theoretical results for the DVD movie "Twister." The y-axis shows the probability for missed deadlines of all block requests. When the number of streams $n \leq 55$, then the probability is very small (<1%). Above this threshold, the probability increases sharply and reaches 1 for n=62. The analytical results based on our 3RV model follow the measurements very closely, except that the 1% transition is one stream higher at 55. The miss probability of the 1RV model is also shown and its transition point is 39. Consequently, not only does our 3RV model result in a 38% improvement over the simpler model (for $p_{req}$=1%), but it also tracks the physical disk performance much more accurately.

Figure 7B:
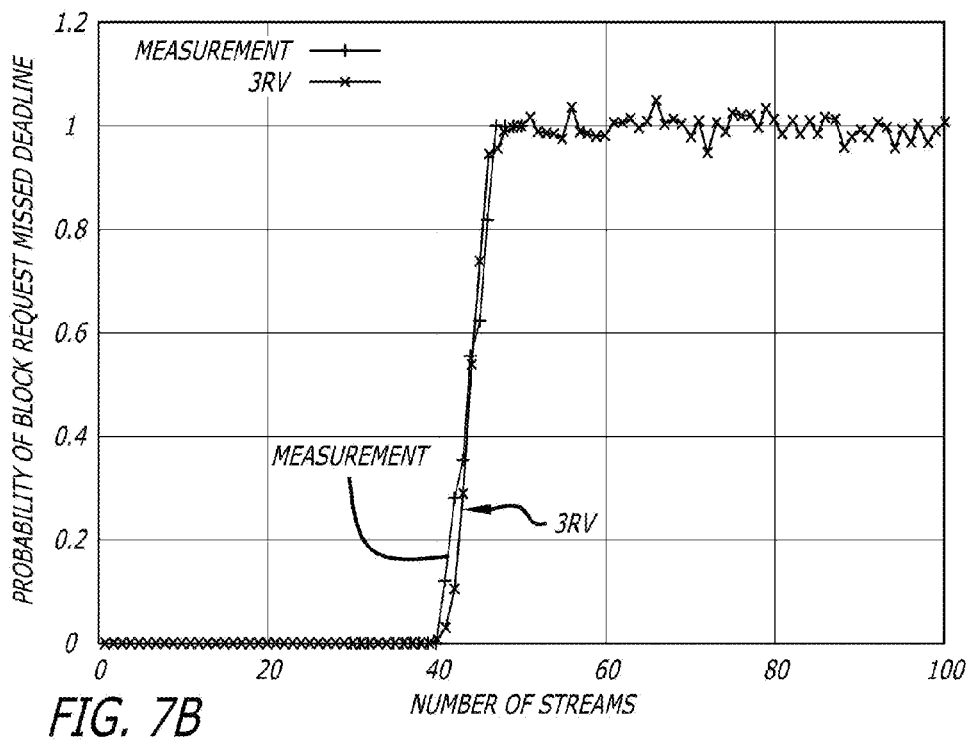
Figure 7C:
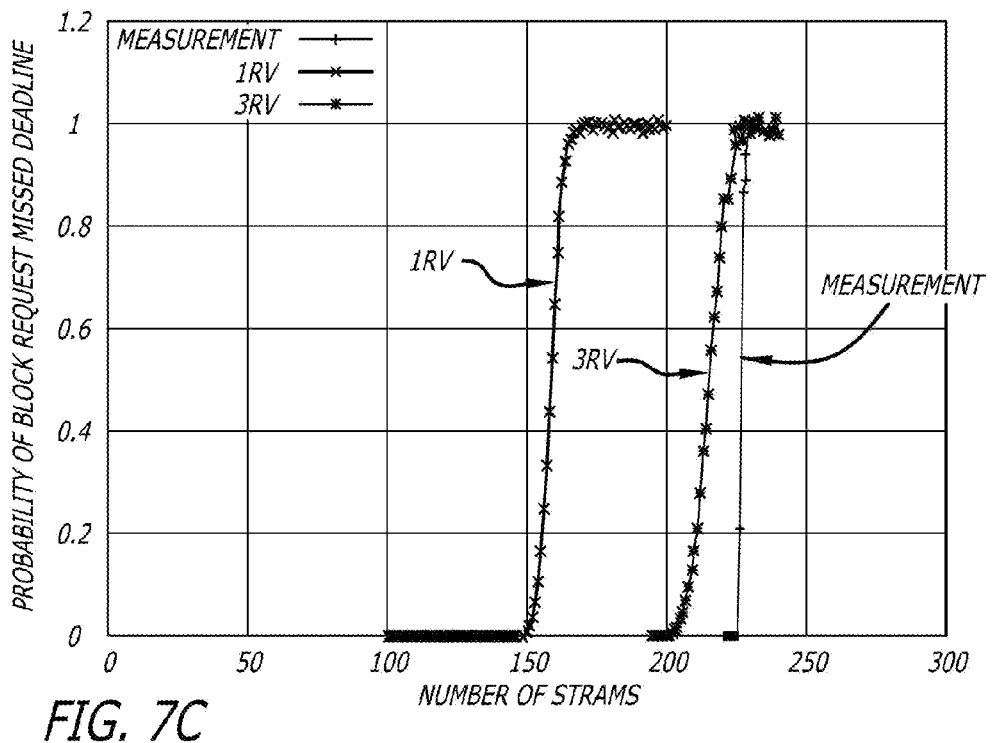
Figure 7D:
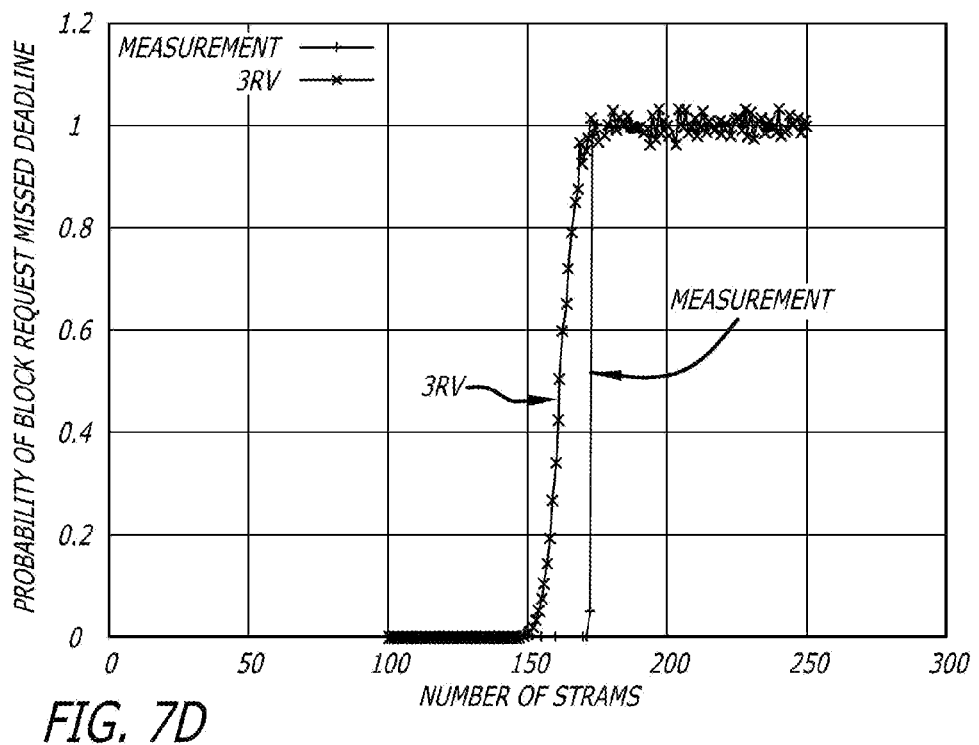

The results for the VCD movie "Charlie's Angels" are shown in FIG. 7(c). Because of the lower bandwidth requirement of this video, a much higher number of streams (150 resp. 200) can be supported. The improvement of 3RV over 1RV is similar to the "Twister" case.

FIGS. 7(b) and (d) show the miss probabilities for our recording experiments. Analogous to the retrieval case, the 3RV curve very closely matches the measured values. Since the disk write bandwidth is significantly lower than the read band width (see FIG. 3(b)), the transition point for, say "Twister," is n=40 instead of n=55 in the stream retrieval experiment.

Figure 8A:
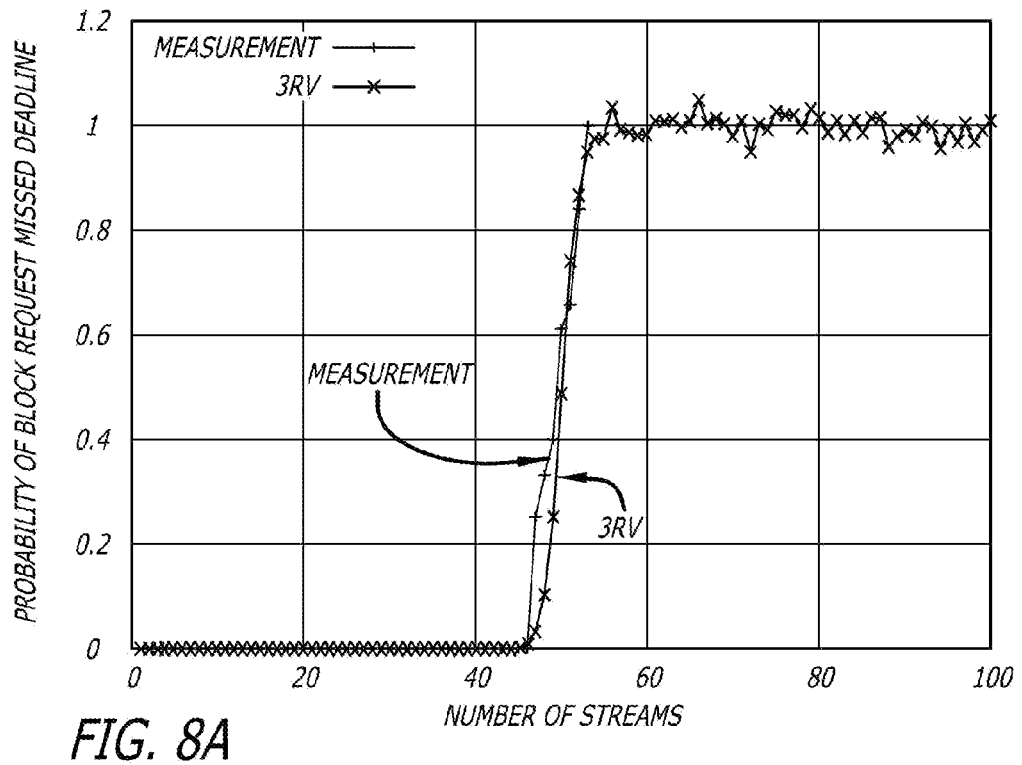
FIGS. 8(a) and 8(b) graphically depict experimental results regarding mixed workload for recording and retrieval, for the two movies used as the experimental test samples.
Figure 8B:
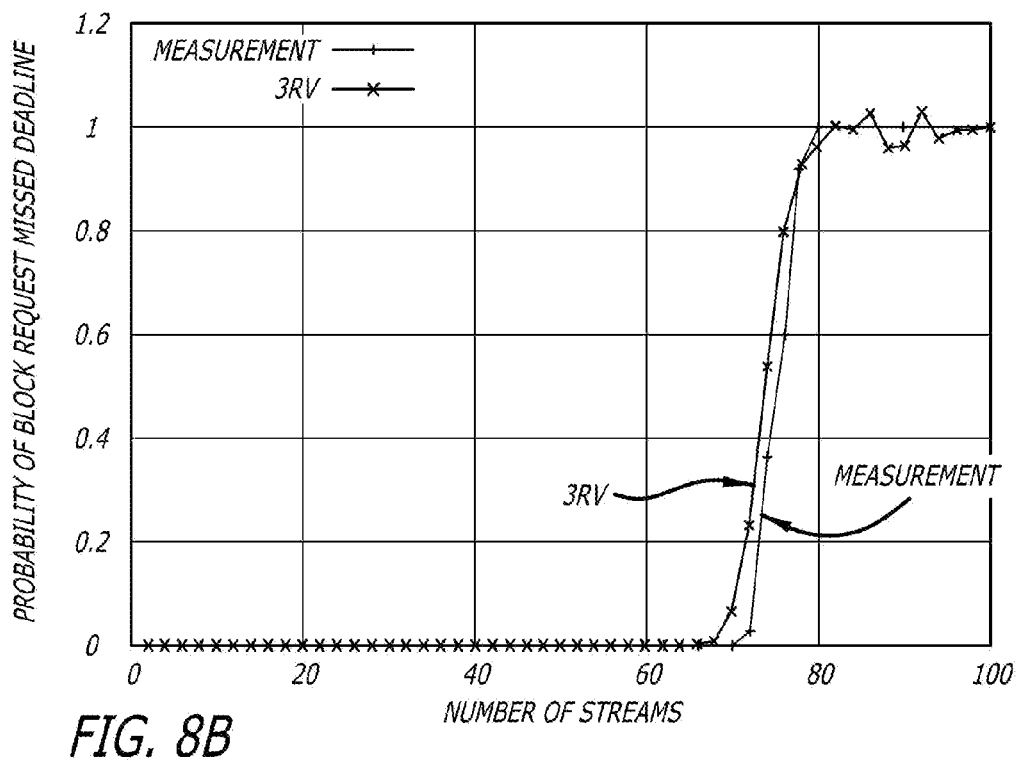

FIG. 8(a) shows an example graph for the movie "Twister" (the other media types produced analogous results). As expected, the 1% transition point at 46 streams lies between the pure retrieval (54) and recording (40) values.

Retrieval Scheduling for Outgoing Streams

Any stream recorder will naturally have to support the retrieval of streams as well. Hence, it needs to include all the functionality that traditional continuous media servers contain. The framework that we presented so far was deliberately designed to be very complementary to the functionality required for stream retrieval. The combination of random data placement and dead-line driven scheduling has been shown previously to be an efficient platform for serving media streams.

Other Functions

For a fully functional data stream recorder a number of additional functions would need to be provided. Such functions include: authentication of users and devices, editing facilities to create new content, browsing facilities to quickly find the content of interest, and remote control of recorder functions. These functions are also necessary in a playback-only system and therefore are not discussed here in detail.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A data stream recorder system for real-time multi-stream recording, retrieval and control of multimedia content via a packet data network, the recorder system comprising:

a plurality of gateways, each for sending and receiving packets containing streaming multimedia content data at real-time rates via the packet data network;

a session manager for communicating via the network with source client devices and receiver client devices to establish and control sessions through the packet data network, to assign sessions to the gateways for the sending and receiving of the packets to and from the client devices, the session manager being configured to:

monitor the available bandwidth of each of the gateways to receive packets containing streaming multimedia content;

receive a request from each of the source client devices for a gateway that can receive packets containing steaming multimedia content at a needed bandwidth specified in the request;

for each received request:
determine which of the gateways has an available bandwidth that is sufficient to receive the packets containing the streaming multimedia content from the source client device that sent the request based on the monitored available bandwidths of the gateways and the needed bandwidth specified in the request;
inform the source client device making the request of the identity of the determined gateway to which the streaming packets should be sent; and
inform the determined gateway of the needed bandwidth specified in the request; and a plurality of storage nodes for storing multimedia content data from packets received via sessions through the gateways and for providing stored multimedia content data to the gateways for communication via sessions through the gateways, each respective storage node comprising:
(a) a plurality of digital storage devices, for storage and retrieval of distributed portions of multimedia content data for a plurality of sessions; and
(b) a scheduler for controlling distribution of content data from packets received at the respective node for storage across the digital storage devices of the respective storage node, wherein:

each of the gateways receiving packets containing content data at real time rates during a recording session distributes the received packets across all of the storage nodes, each scheduler of a respective storage node distributes content data from packets distributed to the respective storage node across all of the digital storage devices of the respective storage node, and each of the gateways, sending packets containing content data at real time rates during a retrieval session, obtains stored content retrieved from storage devices of storage nodes and transmits packets containing the retrieved content as a real-time outgoing stream through the packet data network to at least one of the receiver client devices, whereby the session manager is bypassed during the delivery of the streaming packets from the source client devices to the gateways.

2. The system of claim 1, wherein the session manager implements a statistical admission control with respect to each new session, to assign each new station to one of the gateways in such a manner as to accommodate variable bit rate (VBR) streams and multizone disk drives as the digital storage devices.

3. The system of claim 1, wherein the gateways and storage nodes are configured to receive, store, retrieve and send streaming multimedia content data of multiple different digital media types.

4. The system of claim 1, wherein:
each respective storage node further comprises means for aggregating content data from received packets into data blocks for storage on the digital storage devices of the respective storage node;
the means aggregates content data sequentially from the received packets into the data blocks, and
the scheduler of each respective storage node randomly assigns the data blocks in sequence to the digital storage devices of the respective storage node.

5. The system of claim 1, further comprising a shared pool of memory buffers for assembly of incoming packets into the data blocks and the partitioning of retrieved data blocks into outgoing packets.

6. The system of claim 3, wherein the different digital media types include three or more of the following media types: CD-quality audio, NTSC quality MPEG encoded video, HD quality MPEG encoded video, digital video (DV), DVCPRO50, DVCPROHD, and high definition camera (HD-CAM) video.

7. The system of claim 4, wherein:
the scheduler of each respective storage node randomly assigns content data from the received packets to the digital storage devices of the respective storage node; and
said means aggregates content data assigned to each digital storage device of the respective storage node into a data block for storage on the digital storage device.

8. The system of claim 4, wherein the scheduler of each respective storage node distributes blocks of data and controls the storage devices to randomly place blocks within the surface of a storage disk in each of the digital storage devices of the respective storage node.

9. The system of claim 4, wherein each gateway receiving streaming multimedia content data for recording in the system via an assigned session randomly distributes blocks of packets received via the assigned session to each of the storage nodes for processing and storage of the streaming multimedia content data from those packets.

10. The system of claim 4, wherein the scheduler of each respective storage node provides deadline-driven data reading and writing across all of the digital storage devices of the respective storage node.

11. The system of claim 10, wherein:
a deadline for each block is formed from a time stamp of the last packet contained in the block plus an offset;
for deadline-driven retrieval, the offset is the time when the retrieval request was admitted into the system, and the deadline-driven retrieval allows data blocks for an outgoing stream to be retrieved in order of their deadlines and if some deadlines are identical then in scan order; and
for deadline-driven writing to a storage device, the offset is determined from the delay that a block is allowed to stay in a main memory buffer until it must output to a digital storage device.

\* \* \* \* \*